United States Patent
Toelken

[11] Patent Number: 6,061,946
[45] Date of Patent: May 16, 2000

[54] LIGHTED FISHING ROD AND PRODUCTION THEREOF

[76] Inventor: L. Taizo Toelken, 17028 Locust Rd., Lot A, Neosho, Mo. 64850

[21] Appl. No.: 09/189,113

[22] Filed: Nov. 9, 1998

Related U.S. Application Data

[63] Continuation-in-part of application No. 08/822,359, Mar. 20, 1997, abandoned
[60] Provisional application No. 60/014,870, Apr. 4, 1996.

[51] Int. Cl.[7] .................................................. A01K 87/00
[52] U.S. Cl. .............................. 43/17.5; 43/17; 43/18.1; 43/23; 43/24; 362/109; 362/157
[58] Field of Search .................................. 362/109, 119, 362/800, 157, 190, 191, 198; 43/17.5, 17, 24, 23, 18.1, 4

[56] References Cited

U.S. PATENT DOCUMENTS

| | | | |
|---|---|---|---|
| D. 380,806 | 7/1997 | Ostrander | D22/139 |
| 4,026,059 | 5/1977 | Ochs | 43/17.5 |
| 4,117,618 | 10/1978 | Utsler | 43/17.5 |
| 4,697,375 | 10/1987 | Mills | 43/17.5 |
| 4,709,500 | 12/1987 | Yasumiishi | 43/24 |
| 5,083,247 | 1/1992 | Robinson et al. | 362/109 |
| 5,179,797 | 1/1993 | Edwards et al. | 43/17.5 |
| 5,182,873 | 2/1993 | Aragon, Jr. | 43/17 |
| 5,205,061 | 4/1993 | Echols, Jr. | 43/17.5 |
| 5,276,990 | 1/1994 | Ramirez | 43/17.5 |
| 5,357,410 | 10/1994 | Cota et al. | 362/109 |

*Primary Examiner*—Sandra O'Shea
*Assistant Examiner*—Ismael Negron
*Attorney, Agent, or Firm*—Jonathan A. Bay

[57] ABSTRACT

A fishing rod has a lighted rod tip. The rod tip is produced from a clear or translucent plastic and has a hole in it in which an LED is potted. The conductors to the LED extend all the way through the hollow shaft to batteries in the handle and a switch beyond the handle in a sub-base assembly thereto. The sub-base assembly screws on and off the handle as needed for changing the batteries. The sub-base assembly also forms a compartment for housing the switch. The switch is operated by pushing hard on a thick resilient butt cap, which covers the very butt end of the rod. Hence the switch is well protected against inadvertent operation, shocks, and weather and water. The electrical system as a whole is housed within interior spaces inside the rod, safely protected from water even if the rod were dropped in water.

17 Claims, 5 Drawing Sheets

LIGHTED FISHING ROD AND PRODUCTION THEREOF

CROSS-REFERENCE TO RELATED APPLICATION

This application is a continuation-in-part of U.S. application Ser. No. 08/822,359, filed Mar. 20, 1997, now abandoned which claims the benefit of U.S. Provisional Application No. 60/014,870, filed Apr. 4, 1996.

BACKGROUND AND SUMMARY OF THE INVENTION

The invention relates to a fishing rod that has lighted tip as well as to the process of converting of a conventional, unlit fishing rod into the lighted fishing rod according to the invention.

It is an object of the invention to provide a lighted fishing rod in which the lighting system is substantially waterproofed within suitable interior spaces within the fishing rod.

It is an alternate object of the invention to mount a switch for the lighting system behind a waterproof barrier such that actuation of the switch is achieved by digitally pressing against the waterproof barrier.

It is another object of the invention to situate the light producing device such as an LED or the like within the body of the rod tip for maximum visual feedback of the absence or presence of vibrations at the rod tip.

It is an additional object of the invention to provide sealed access to the batteries for the lighting system consistent with the other waterproofing objects of the invention.

These and other aspects and objects are provided according to the invention in a fishing rod that has a hollow shaft extending between an open tip end and an open base end, a tip on the tip end supporting an end eyelet off the shaft and having a body, a tubular reel seat assembly disposed telescoped on the shaft from the base end and slid up the shaft to leave a short extension of the base of the shaft exposed, a tubular handle assembly extending between a forward end and a butt end and disposed telescoped on the shaft from the base end such that the forward end is slid up generally to the reel seat assembly, and having a flexible membrane sealing the butt end; and a lighting system mounted substantially waterproof inside interior spaces of the lighted fishing rod, and comprising an LED lamp, a battery and battery holder, a push-to-ON/push-to-OFF switch, and conductors arranged to complete a circuit thereamong. Wherein, the body of the tip is formed with a socket for telescoping over the tip end of the shaft, the body also being formed with a compartment in communication with the socket and in which is potted the LED such that terminals of the LED extend toward the socket to allow conductors passing out the tip end of the shaft to connect to said terminals. And also, the switch is mounted in the handle assembly in such close proximity to the flexible membrane such that a user actuates the switch by digitally flexing the membrane whereby illumination of the LED gives an observer visual feedback of the absence or presence of movement of the tip including during low light levels or darkness.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 7 is a view comparable to FIG. 3 except showing an alternate tip end arrangement for the rod in FIG. 1; and, FIGS. 8–11 comprise a set of views cooperatively depicting a lighted fishing rod in accordance with the invention wherein:

FIG. 10 is a comparable enlarged, partial section view of the rod's tip, and, FIG. 11 is a perspective view of the bungee pullout eliminator of FIG. 8.

DETAILED DESCRIPTION OF THE INVENTION

Figure 1:
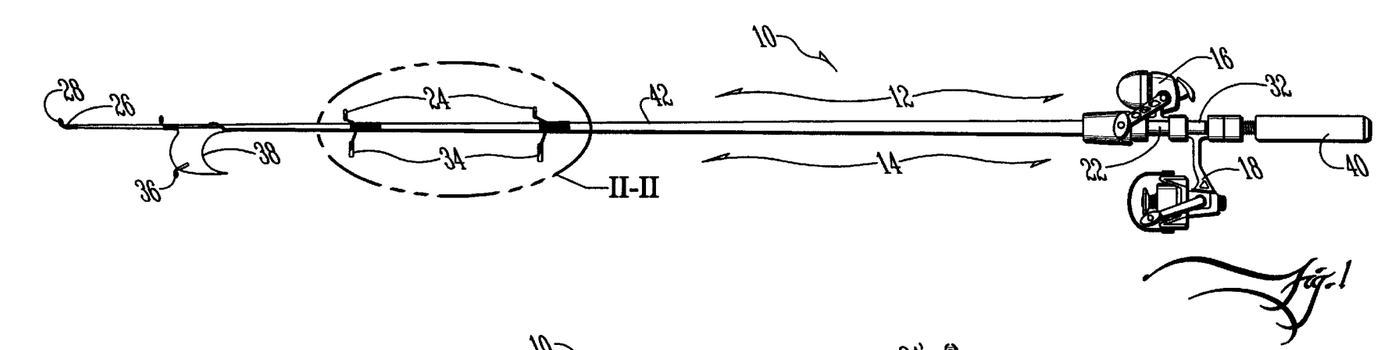
FIG. 1 is a perspective side view of a fishing rod with plural bait-casting arrangements in accordance with the invention wherein, for illustrative purposes, an upper arrangement is shown equipped with a spin-cast reel and a diametrically opposed lower arrangement is shown equipped with a spinning reel.

In FIG. 1, a fishing rod 10 with plural bait-casting arrangements 12 and 14 in accordance with the invention is shown dually equipped with both a spin-cast reel 16 and a spinning reel 18. From the vantage point of FIG. 1, the fishing rod 10 is aligned extending horizontally and is oriented such that the spin-cast reel 16 appears upright and the spinning reel 18 appears inverted.

Whereas a user of the fishing rod 10 might give the rod 10 such an orientation as shown in FIG. 1 as just before a cast, the fishing rod 10, however, can be viewed from other vantage points than the vantage point chosen for FIG. 1. Accordingly, terms like "upright" and "inverted" or "upper" and "lower", and also "forward" and "rearward" and the like, are used merely for convenience in this description and neither limit the orientation nor the configuration of the invention to what is shown by FIG. 1.

The fishing rod 10 comprises an upper bait-casting arrangement 12 and a lower bait-casting arrangement 14 diametrically opposed to the upper bait-casting arrangement 12. The upper bait-casting arrangement 12 comprises a reel seat 22 configured to mount the spin-cast reel 16 and an upper set 24 of line guides which terminate at the tip end 26 of the rod in a terminal eyelet 28. The lower bait-casting arrangement 14 comprises a real seat 32 configured to mount the spinning reel 18 and a lower set 34 of line guides which terminate in an end eyelet 36 mounted in a bracket 38. The real seats 22 and 32 are formed in a handle 40 that has a rearward end defining the butt end of the fishing rod 10. Extending out from the handle 40 is a tapered shaft 42 which is conventional and can be constructed from glass- and/or graphite-epoxy composite materials, or like suitable materials.

Figure 2:
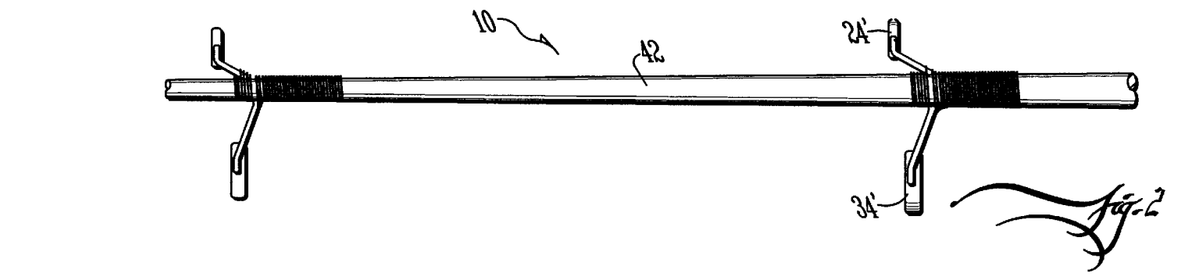
FIG. 2 is an enlarged view of detail II in FIG. 1.
Figure 3:
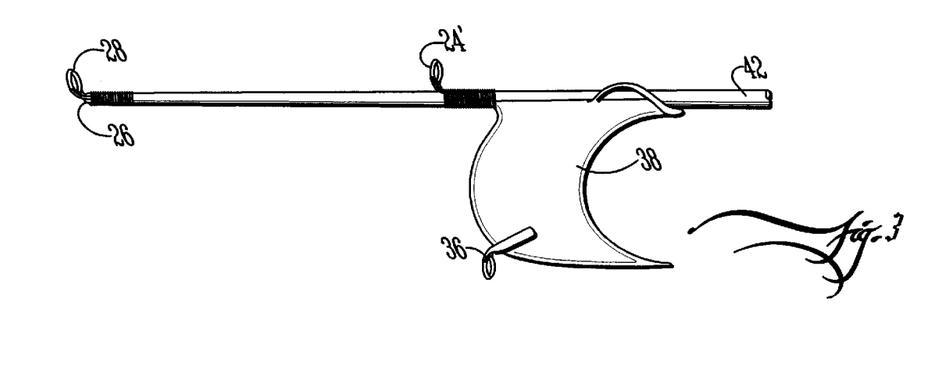
FIG. 3 is an enlarged view of the tip end of the rod in FIG. 1.

FIG. 2 shows that a given pair of an upper and a lower line guide 24' and 34' can be attached to the shaft 42 by the same winding. FIG. 3 shows that the terminal eyelet 28, which is part of the upper set of line guides 24, is attached directly to the very tip end 26 of the tapered shaft 42. However, the end eyelet 36 which is part of the lower set of line guides 34, is affixed to the shaft 42 via the bracket 38.

The bracket 38 is made from a polymer or resinous moldable material, but any suitable material will suffice. The bracket 38 has a through hole formed through it for threading over the tapered shaft 42 before the terminal eyelet 28 or line guides 24' or 34' are affixed. The bracket is affixed in position as shown by a suitable adhesive, epoxy or like bonding process. The bracket 38 carries the end eyelet 36 in a position located rearward and down from the terminal eyelet 28. Thus the end eyelet 36 is positioned generally as shown by FIG. 3 to keep a bait (not shown) that is reeled tight against the end eyelet 36 from snagging the line extending through the upper set of line guides 24 (baits and line are not shown). FIGS. 1 and 2 show that the lower set of line guides 34 would carry line from the spinning reel 18 (line not shown) generally further away from the tapered shaft 42 than the spacing from the shaft 42 that would occur with line (not shown) from the spin-cast reel 16 extending through the upper set of line guides 24.

Figure 7:
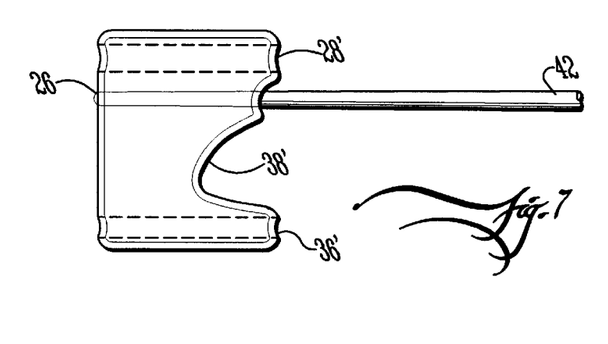

FIG. 7 shows an alternative version of bracket 38'. This FIG. 7 version of bracket 38' is affixed to the very tip end 26 of shaft 42. The bracket is simultaneously formed with an upper bore 28' functioning as the end eyelet for the upper set of line guides 24, and a lower bore 36' functioning as the end eyelet for the lower set of line guides 34. This version of the bracket 38' gives the lower set of line guides 34 and lower bore 36' a relatively longer effective rod length compared to the FIGS. 1 and 3 version.

Figure 4A:
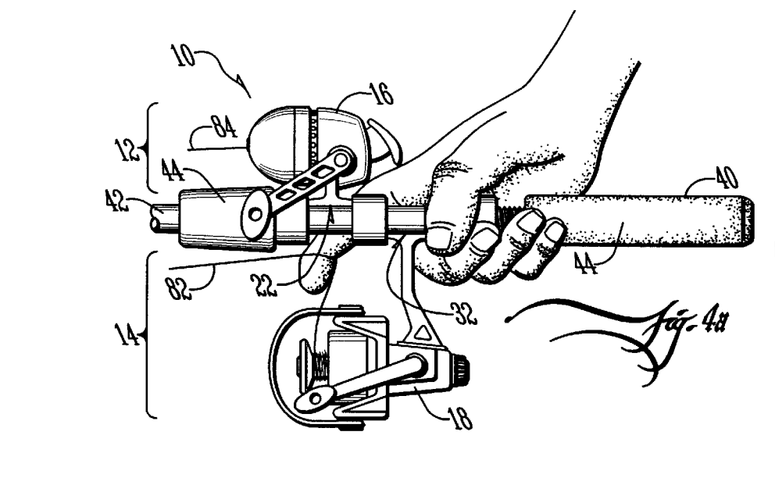
FIG. 4a is an enlarged view of the handle of the fishing rod in FIG. 1, showing how a user of the rod grips it for casting a bait with the spinning reel.
Figure 4B:
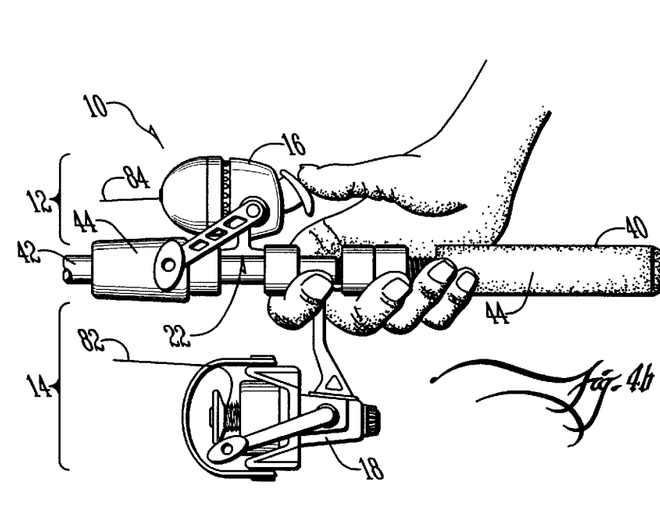
FIG. 4b is a view comparable to FIG. 4a except showing the user gripping the handle for casting a bait with the spin-cast reel.

With general reference to FIGS. 4a and 4b, the handle 40 comprises a spaced pair of foam sleeves 44 that surround a generally cylindrical base stock 46, a portion 48 of which is generally exposed between the two spaced foam sleeves 44. The exposed portion 48 of the cylindrical base stock 46 is at least partly formed with screw thread 50, and its surface is the surface which makes direct contact with the mounting structures of the reels 16 and 18 when mounted to the handle 40.

Figure 5:
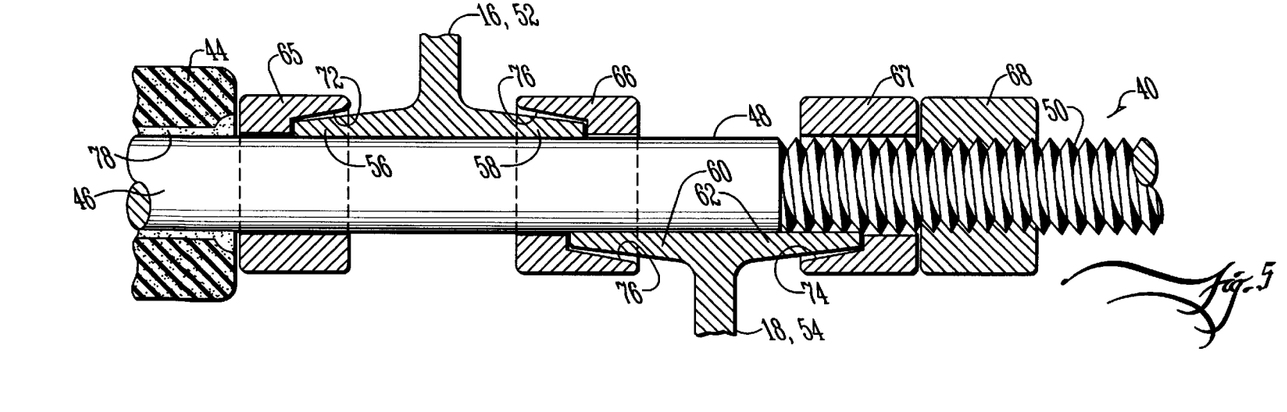
FIG. 5 is an enlarged, partial section view taken along a vertical plane containing the central axis of the handle in FIGS. 4a or 4b, with portions broken away.

FIG. 5 shows that the reels 16 and 18 have conventional mounting structures 52 and 54. In the case of the spin-cast reel 16, it has an inverted-T shaped base 52 with forward and rearward feet 56 and 58, respectively. The spinning reel 18 has a T-shaped head 54 that also has forward and rearward feet 60 and 62. The handle 40 comprises clamping hardware 65–68 for mounting and releasably clamping the fishing reels 16 and 18 in position. This hardware 65–68 includes a forward collar 65, a mirror-image rearward collar 67, a middle collar 66 positioned therebetween, and a threaded nut 68 which can abut against the back end of the rearward collar.

The forward collar 65 has a socket 72 recessed in it that is shaped and arranged for insertion in it of the spin-cast reel 16's forward foot 56. Also, the rearward collar 67 has a comparable socket 74 which is shaped and arranged for the spinning reel 18's rearward foot 62. The middle collar 66 is formed with alternate sockets 76 as shown, shaped and arranged to insert therein the spin-cast reel 16's rearward foot 58 and the spinning reel 18's forward foot 60, respectively. Given the foregoing, the forward and middle collars 65–66 define the reel-seat 22 for the spin-cast reel 16 whereas the middle and rearward collars 66–67 define the reel-seat 32 for the spinning reel 18.

The nut 68 is adjustable against the rearward collar 67 to tighten the fit between the collars 65–67 and the reel feet because the forward collar 65 is limited by the obstructing placement of an adhesive weld 78 which also acts to bond the foam sleeve 44. The screw thread portion 50 of the cylindrical base stock 46 extends sufficiently forward in the exposed portion 48 so that either the spin-cast reel 16 or the spinning reel 18 can be removed from the handle 40 and yet the nut 68 has sufficient travel on the screw thread 50 to squeeze all the collars 65–67 together to clamp the one remaining reel 16 or 18 on the handle 40. While it is preferred that the fishing rod 10 be equipped with the two reels 16 and 18 to give the user the advantages of dual use, the user may opt to omit one reel or another for a variety of reasons.

With general reference to FIGS. 4a and 4b, use of the fishing rod 10 in accordance with the invention preferably occurs as follows. The user preferably equips the fishing rod 10 with a rig of the spinning reel 18, line 82 and bait (bait not shown) and another rig comprising the spin-cast reel 16, line 84 and bait (not shown). That way, the user is given dual use of the spin-cast reel 16 and spinning reel 18 at his or her option. On any given cast, the user can elect to cast the bait associated with the spin-cast rig 16 and 84 or the spinning rig 18 and 82, depending on whichever bait the user wants to cast on that cast. An example of when, during a fishing trip, that the user would like to have this option is the following. When fishing streams, typically the fishable water successively varies between relatively fast-moving shallow riffles and deeper, calmer pools. For fishing the riffle, the user may desire to cast a lead-headed jig. For fishing the pool, the user may opt to fish a diving plug. The fishing rod 10 in accordance with the invention obviates the need to change bait or lures between casts because both lures can be accessed on any given cast by using either the spin-cast rig 16 and 84 or spinning rig 18 and 82 as desired. Additionally, the fishing rod 10 further obviates the need to carry two rods along to accomplish the same work as the rod 10 in accordance with the invention. Carrying two rods is particularly burdensome while wading in the stream when fishing.

Another inventive aspect of the fishing rod 10 relates to the configuration of the reel seats 22 and 32 on the handle 40 as shown by comparing FIG. 4a to FIG. 4b. The user need only grasp the handle 40 with his or her casting hand in only one general location because the user can easily adjust his or her grasp to operate either the spinning reel 18 (see FIG. 4a) or spin-cast reel 16 (see FIG. 4b) with only a slight shift in the position of the casting hand. The user need not re-orient the rod 10 or otherwise perform a complicated maneuver to access and operate either reel 16 or 18 for a cast.

Figure 6:
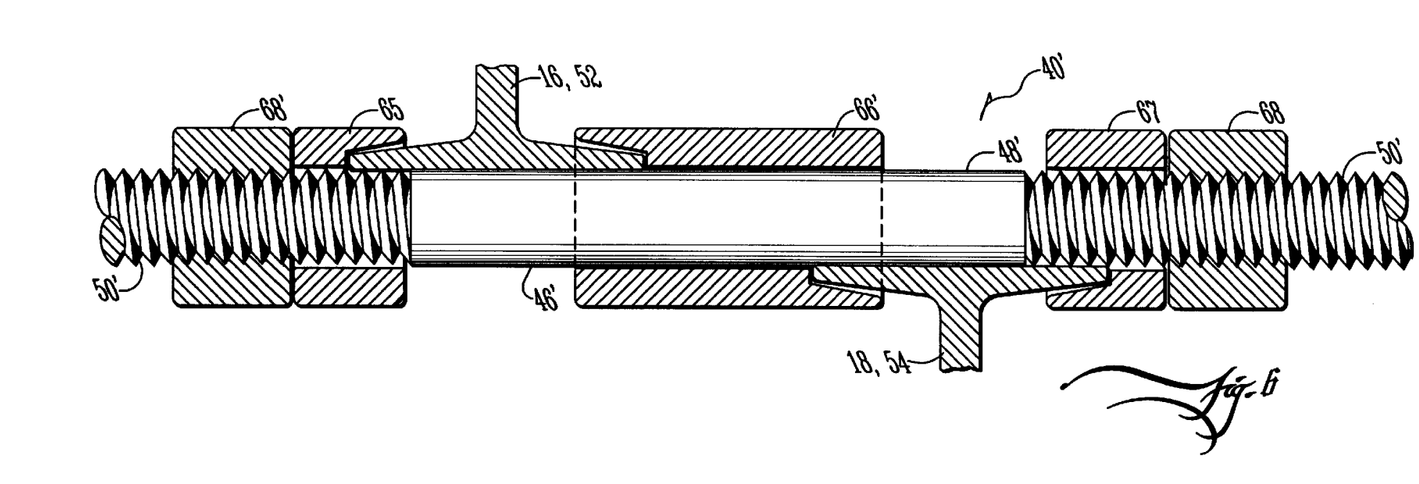
FIG. 6 is a view comparable to FIG. 5 except showing an alternate arrangement of the handle.

FIG. 6 shows an alternate configuration of a handle 40' for the fishing rod 10 in accordance with the invention. The handle 40' comprises an elongated middle collar 66' which is preferably immovably affixed to the cylindrical base stock 46' as shown. The cylindrical base stock 46' has an exposed portion 48' which is formed by two portions of screw thread 50' in opposite positions flanking the fixed middle collar 66'.

Similar as the FIG. 5 embodiment of the handle 40, the FIG. 6 embodiment of the handle 40' mounts the spinning reel 18 via the middle and rearward collars 66' and 67 clamping on the T-shaped head 54 when the threaded nut 68 is tightened against the rearward collar 67. However, the mounting of the spin-cast reel 16 is achieved via the forward and middle collars 65 and 66' clamping on the inverted-T shaped base 52 when a second nut 68' is tightened against the forward collar 65.

By these arrangements, the reels 16 and 18 are independently mountable without slackening the mounting of the other. Also, the middle collar 66' can be given various lengths in order to give various users who will naturally have different glove or hand sizes, a more comfortable grip on the handle 40' for better control over and handling of the fishing rod 10. The outer surface of the middle collar 66' might also include knurling or a foam sleeve and the like to increase frictional gripping when grasped (surface treatment not shown).

A number of additional features and objects will be apparent in connection with the foregoing discussion of the above preferred embodiments and examples. A fishing rod in accordance with the invention can be alternatively configured such that the two bait-casting arrangements are asymmetrically arranged (not shown), rather than the symmetrical arrangement shown by the drawing figures. Additionally, a fishing rod in accordance with the invention can be configured to have more than two bait-casting arrangements (not shown), arranged either symmetrically among one another or not.

To turn now to FIGS. 8 through 11, these four views comprise a set which together cooperatively depict a lighted fishing rod 100 in accordance with the invention. Lighted fishing rod systems are popular for such situations as anglers fishing with bait from a bank or shore at night or other low visibility times. In such situations an angler typically casts a bait out, props the rod up on any suitable support (eg., U.S. Pat. No. 5,205,061—Echols, Jr. shows rocks) and moves aside as he or she waits patiently in hopes the bait attracts a bite. Such an angler may have multiple bait-casting arrangements spread out along a bank or shore. Providing the rods with a source of illumination greatly aids the angler in detection of a bite in the low light or darkness. Some light-producing devices, however, work better when great distances are involved than others, especially LED's, which provide the competing advantages of being both highly visible at distance but without much illumination power. In other words, it would be counter-productive to light up like daylight as that would undesirably put the fish off.

Hence it is one object of the invention to provide a lighted fishing rod in which the lighting system is substantially waterproofed within suitable interior spaces within the fishing rod. That way the lighting system can survive the rod being dropped in the water. It is an alternate object of the invention to mount a switch for the lighting system behind a waterproof barrier such that actuation of the switch is achieved by digitally pressing against the waterproof barrier. It is another object of the invention to situate the light producing device such as an LED or the like at or very near the rod tip for maximum visual feedback of the absence or presence of vibrations at the rod tip. It is an additional object of the invention to provide a sealed access to the batteries for the lighting system, which is consistent with the other goals toward providing a waterproofed lighting system that were previously mentioned.

Again, it is an inventive aspect that the lighted fishing rod 100 in accordance with the invention incorporates an electrical system (see, eg., 160 in FIGS. 9 and 10) which is substantially weatherproofed and waterproofed. The electrical system includes at least batteries, a light-producing device 102 at the rod tip and a switch in the handle as will be more fully described below. It is another inventive aspect that the production of such a lighted fishing rod 100 is achieved by converting a conventional, off-the-shelf, unlit fishing rod into the invention by means of a kit of parts which altogether cost less than $4.00 or so. It is characteristic of the lighted fishing rod 100 in accordance with the invention to be affordable, practical, convenient and durable.

Figure 8:
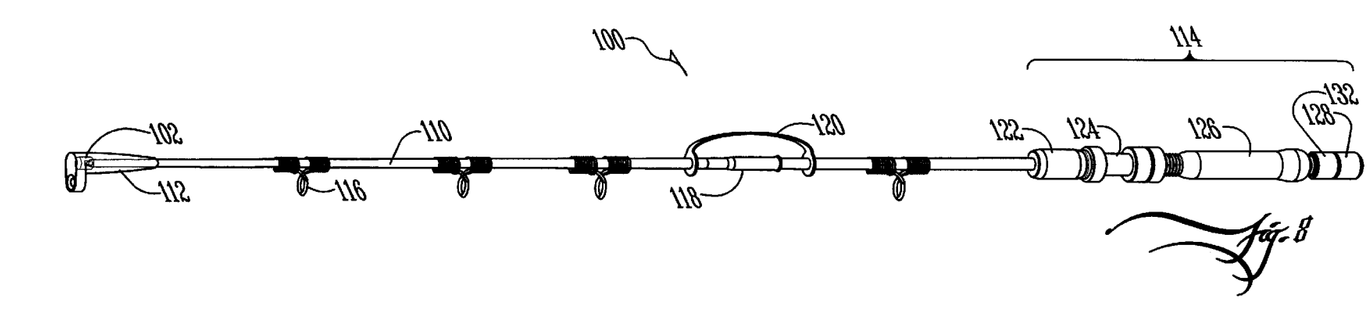
FIG. 8 is a side perspective view of the lighted fishing rod thereof.

FIG. 8 shows a spinning-rod version 100 of the lighted fishing rod in accordance with the invention. It includes a composite hollow shaft 110. The composite material of the shaft 110 typically has glass or carbon fibers set in a hardened resin matrix as is known in the art. Other suitable fibers and/or blends thereof are also used. The shaft 110 extends between a tip 112 and a handle 114, and carries a set of line guides 116 progressing from the handle 114 to the tip 112. The shaft 110 "breaks" in two at the instance a user pulling it apart at a ferrule 118 (this broken apart condition is not shown), as is known for making the rod 100 more compact for convenience of portability.

The ferrule 118 is spanned by a bungee pullout eliminator 120. The pullout eliminator prevents damage to internal conductors (not shown in FIG. 8, but see FIGS. 9 or 10) which extend through the hollow shaft 110 between the handle 114 and the tip 112.

The handle 114 is conventional inasmuch as comprising an optional fore-grip 122, a reel seat assembly 124 including a nut-driven clamping arrangement, a base grip 126 and an optional butt cap 128. It is an inventive aspect that this handle 114 has been modified as it has, which includes the incorporation of a locking collar 132 between the base grip 126 and butt cap 128.

Figure 9:
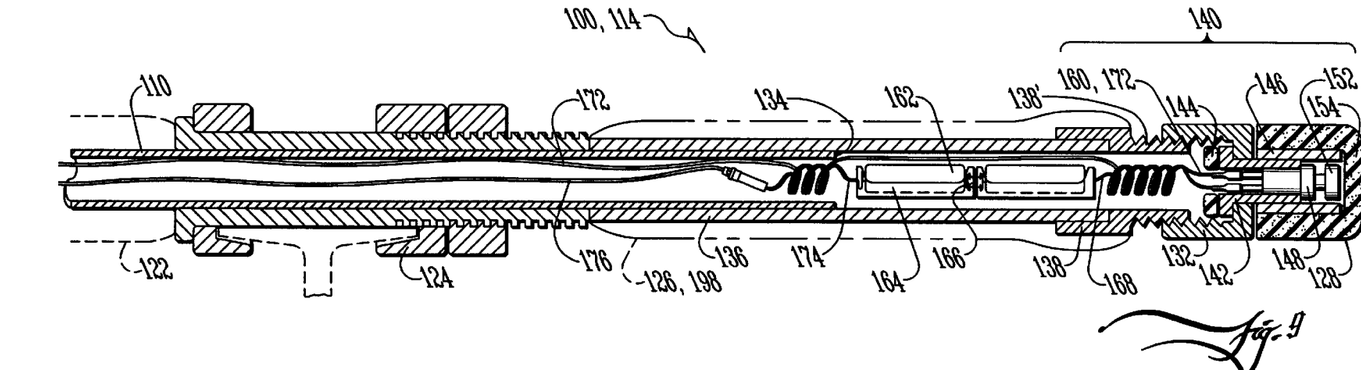
FIG. 9 is an enlarged, partial section view of the rod's handle, as taken along a vertical axis of symmetry, and with portions broken away.

FIG. 9 shows more detail of the handle 114 and its modifications in accordance with the invention.

By way of background, a conventional, off-the-shelf, unlit fishing rod is characterized by the following general aspects, most which are more or less discernible in FIG. 9. In modern rods it is widely popular to continue the base extension of the hollow shaft 110 right through the reel seat assembly 124 and base grip 126, such that the shaft 110's very base end (the base end of shaft 110 as illustrated is indicated by reference numeral 134) reaches right back to the very butt cap 128 of the rod 100. The whole original extent of shaft 110's base extension is not shown in FIG. 9 because the last four to six inches (ten to twelve cm) or so of the end has been severed off. To put this in perspective, it is no longer popular to use a shortened a rod shaft which ends forward of the reel seat. It had been formerly popular to do this, especially for rods for spin-cast or bait-casting reels, because then the reel seat could be arranged in a U-shaped saddle in the rod handle, and the handle could be configured in a modified pistol grip. As said, the much more modern, widely popular way to arrange a shaft is to extend it right on through the fore grip 122, reel seat 124 and base grip 126. The reason for this is to let the angler feel through the handle 114 much fainter vibrations in the shaft 110 than can be accomplished the other way. As an aside, modern composite materials are also much stiffer and more sensitive to transmitting fish-induced line vibrations to the handle 114. The whole package put together should mean that anglers are provided with a whole lot more sensitivity to fish bites than they used to.

Hence, this rod 100 in its original off-the-shelf, unlit format had a four to six inch longer shaft 110 at the base end 134 than shown here. The rod 100 in it original format also had its original base grip covering (not shown), which has been removed and discarded. The rod 100 may or may not have originally had a butt cap 128. Some OEM's include butt caps for wear resistance much like walking canes typically include a butt ferrule to protect against splitting or erosion. Other fishing rod OEM's omit butt caps because, sensibly, an angler ought not to scape the rod butt on the ground as often or as roughly as a cane user might do with a cane. Still, there is no general consensus in the industry on inclusion or exclusion of butt caps. In some cases the same OEM might include the butt cap on some of its models and exclude the but caps on others.

Thus the foregoing generally describes what the handle 114 of the fishing rod 100 in accordance with the invention appeared like before its modification began. The steps taken to modify the handle 114 generally include the following. The shaft 110 and its original overlying base grip material is sawed off about four inches (ten cm) from the end of the reel seat. The remainder of the original base grip material is completely or substantially removed. Typical materials for base grip coverings include without limitation synthetic foams and natural cork. If the covering material does not come off easily it is hence shaved off by any suitable way, including by a whittling action with a razor or the like. The remaining components of the original handle are kept, and this includes at least the reel seat 124 and fore grip 122 (if any is included).

The four inches of the shaft 110's base end 134 exposed beyond the reel seat 124 are telescoped into a sleeve 136 of ¾-inch PVC tubing or the like, which is about twice as long. The opposite end of this eight inch (eg., twenty cm) or so sleeve 136 is inserted in an adapter fitting 138 which is a ¾-inch female tubing fitting on one side and a ½-inch male garden-hose fitting on the other. The sleeve 136 is affixed to the shaft 110 at one end and the adapter 138 at the other by means of an epoxy adhesive, although any suitable bonding compound will suffice.

An inventive aspect includes a sub-base assembly 140 which screws onto the ½-inch male garden-hose thread 138' by means of a female ½-inch garden hose fitting 132:—ie., the internally-threaded locking collar 132 which spins on a flanged hose-barb 142. The flanged hose-barb 142 has the flange which not only retains the collar 132 but also forms a gasket seat against which a resilient gasket is compressed when the collar 132 is tightened on the male fitting 138' (this is not shown in FIG. 9, as the collar 132 is slackened nearly all the way off the male thread 138'). The cylinder portion of the hose barb 142 is telescoped into a stubby sleeve 146 of ¾-inch PVC tubing or the like. The outer surface of stubby sleeve 146 provides a gripping surface for the heavy butt cap 128, which is produced from synthetic rubber or like. The foregoing female ½-inch garden-hose fitting 132 and 142, the stubby sleeve 146, and the butt cap 128 cooperatively form a switch compartment in accordance with the invention.

An inventive aspect of the sub-base assembly 140 includes the mounting of a push-to-ON/push-to-OFF switch 148. The switch 148 as shown is a commonly available type obtained from RADIO SHACK$^{SM}$. It is chosen for the compact size of its cylindrical body which nests closely inside the lumen of the hose barb 142. The switch 148 is potted in the hose barb 142 by use of an epoxy adhesive or the like. It is now apparent that the measure of length for the stubby sleeve 146 is chosen so that the pushbutton 152 of the switch 148 will rest just slightly spaced from the flexible butt-membrane 154 of the butt cap 128. This slight spacing or gap is depicted in FIG. 9. In use, a user must operate the switch 148's pushbutton 152 by digitally depressing it from the outside of the butt membrane 154. To successfully do this ordinarily requires much pressure. In fact most users will find themselves unable to do this with their fingers and hence having to use their thumbs. It is preferred that the actuation of the switch 148 requires as much deliberate trouble as it does. That way the switch 148 is well-insulated from inadvertent operation as well as shock, weather and water.

The switch 148 needless to say alternatively makes and breaks the power circuit for the electrical system 160 in accordance with the invention. Other aspects of the electrical system 160 as shown by FIG. 9 include the following. The electrical connections for the switch 148 comprise a pair of tab terminals. A power supply comprises a pair of n-size battery cells 162 connected in series to give a 3-VDC system. Each n-size battery cell 162 is nested in an appropriately sized battery holder 164. These battery holders 164 are also available from RADIO SHACK$^{SM}$. The battery holders 164 are modified and fastened in head-to-tail fashion by the simple expediency of an aluminum pop rivet 166. The pop rivet 166 serves not only to affix the pair of battery holders 164 together but also complete the link of the electric circuit between the two holders 164.

A black lead 168 extends off the back of the trailing battery holder 164. The black lead 168 is an insulated conductor which terminates in a quick connector for sliding onto one of the two tab terminals of the switch 148. The complimenting conductor 172 also terminates in a quick connector for sliding onto the other tab terminal of the switch 148. This compliment conductor 172 stretches all the way from its connection with the switch 148 to a forward terminus soldered to one terminal of the light-producing device 102 in the rod tip 112 (not shown in FIG. 9, but see FIG. 10). A red lead 174 extends off the end of the forward battery holder 164, and it also terminates in a quick connector. There is an elongated return conductor 176 that returns from the other terminal of the light-producing device 102 in the rod tip 112 (again, see FIG. 10). Hence the return conductor 176 and its compliment 172 co-extend through substantially the entire length of the lumen of the hollow shaft 110. The trailing end of the return conductor 176 terminates in quick-connect tab for inserting in the quick connector of the red lead 174.

In order to allow for necessary slack in the conductors, there are two places where the complimentary positive and negative conductors rest in loose coils. One place is between the trailing battery holder 164 and the switch 148. The loose coils there pull out when the sub-base assembly 140 is unscrewed and pulled apart a short distance. The other place of loose coils is found just forward of the battery holders 164. A user can pull gently on the black lead 168 to pull out the battery holders 164. The loose coils there pull out to allow exit of the battery holders 164 for replacing the batteries 162 and the like. Reassembly is easily accomplished by sliding insertion of the battery holders 164. The sliding battery holders 164 push the extra length of conductors ahead of themselves such that the conductors re-form in more or less loose bunches or coils and the like. In the same way, re-attaching the sub-base assembly is achieved by stuffing in the extra length of conductors that trail the battery holders 164. The conductors typically re-form in loose bunches or coils and the like, and are practically never pinched by the compressed gasket 144.

Figures 10, 11:
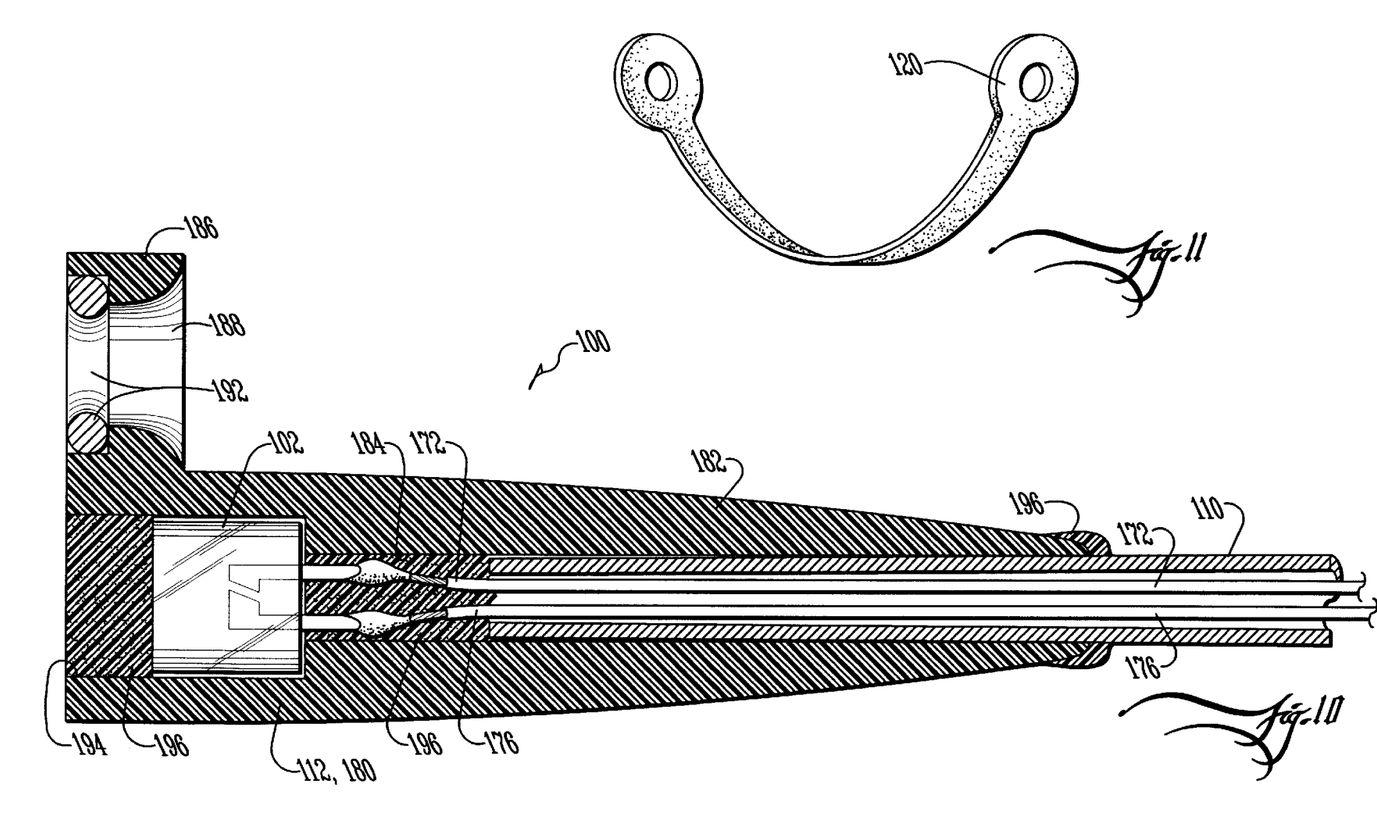

With reference to FIG. 10, it shows various inventive aspects with the rod tip 112 in accordance with the invention. The rod tip 112 has been spun a half turn so that the normally down flange (ie., 186) is upright. In use with a spinning reel, the rod tip 112 would be oriented more or less as shown FIG. 8. By way of background, the rod tip 112 illustrated in the drawings is a custom rod tip configured in accordance with the invention. The OEM off-the-shelf, unlit rod tip (not shown) has been removed and discarded. The shaft 110 is cut behind the original rod tip by a specific distance according to the following criterion. The shaft 110 is cut back until the size of the end hole allows the passage of the two conductors 172 and 176, wherein the insulation of the ground conductor 172 has its insulation stripped off ten or twelve inches back. In other words, the end hole in the shaft 110 is kept as small as possible but still barely large enough to squeeze through the conductors 172 and 176, as long as the insulation is stripped of one of the conductors 172 or 176. Needless to say it is a natural condition of fishing rod shafts that they are tapered. If the insulation were left on both conductors 172 and 176, there would have to be a larger end hole in the shaft 110 to accommodate them both, and that would result in cutting back the shaft 110 further still. Stripping off the insulation from one of conductors 172 or 176 allows the least amount of the shaft 110 to be trimmed back to accommodate them both. With any given style of shaft, the optimum least amount is determined by trial and error. When processing a batch of like shafts, the shafts can all be trimmed back by the same measure.

The tip 112 in accordance with the invention has a body 180 fashioned from a clear plastic or, more particularly, a variety of polycarbonate that is marketed under the tradename LEXAN™. However, any suitable transparent or translucent material will suffice. The polycarbonate body 180 is configured in an L-shape of which the stem portion 182 has a rod hole 184 in it to slide over the rod shaft 110, and the flange portion 186 thereof is formed with a countersunk line hole 188 in which is fixed an abrasion-resistant eyelet 192. Such eyelets are widely available, and presently the inventor hereof prefers an aluminum oxide ceramic eyelet. The eyelet 192 is affixed by means of an epoxy adhesive or the like.

The polycarbonate body 180 presently is fabricated by a hand operation. Several sets of rod and line holes 184 and 188 are pre-drilled in strip stock material (not shown). Each future rod tip 112 is sawed off the strip stock material one-by-one. Grinding and sanding rounds all the rectangular edges to give the rod tip 112 its final smooth shape.

The rod hole 184 in the stem 182 of the polycarbonate body 180 has a larger diameter countersunk portion 194 which is sized to allow sliding insertion of the cylindrical body of such an LED 102 as may be commonly obtained from RADIO SHACK™ or the like. Red is preferred. During assembly, the process of attaching the rod tip 112 and potting the LED 102 comprises the following steps. Starting at an instance before the conductors 172 and 176 are threaded through the shaft 110, the conductor 172 for the ground side of the circuit is stripped bare of its insulation for about eight or ten inches (twenty or twenty-five cm) or so of what will become its forward tag end. Then the forward tag ends of both conductors 172 and 176 are threaded together through the lumen of the shaft 110, starting from the handle 114 (see FIG. 9) until the forward tag ends poke out the forward hole in the rod shaft 110. The tag ends of the conductors 172 and 176 are pulled out for four or six inches or so. The conductors 172 and 176 are next threaded through the rod hole 184 in the rod tip 112. The rod tip 112 is slid onto the forward end of the rod shaft 110, but is not otherwise bonded or affixed. The tag ends of the conductors 172 and 176 are soldered to the appropriate terminals of the LED 102 as shown.

Next, the electric circuit is completed to a test battery in order to illuminate the LED 102. The rod hole 184 of the rod tip 112 is filled with wet epoxy 196, which epoxy adhesive 196 will eventually harden after enough lapse of time. From all the way back at the handle 114 of the rod 100, the conductors are pulled, which causes the LED 102 to back into the countersunk portion 194 of the rod hole 184 in the rod tip 112. Typically the assembling worker helps the LED 102 align with the rod hole 194 at the start of its entry. But once started, the LED 102 is pulled all the back to where stopped by means of the worker pulling on the conductors way back at the handle 114 of the rod 100. On occasions, the conductors 172 and 176 short at near the LED 102's terminals. This is detected by the worker by seeing the LED 102 go OFF. The worker can sometimes push and pull the conductors and/or the rod tip back and forth until the LED 102 returns ON. If it does not, the entire rod tip 112 has to be pulled off the shaft 110 so that the LED 102 can be extracted and tested to see if burnt out or not. If indeed burnt it has to be replaced. Then the whole foregoing process is repeated until successful.

The order of performance of the foregoing steps can be changed in various ways and the worker can still get to the same overall end result.

Completion of the potting of the LED produces an optical effect as described next. Since the body 180 of the tip 112 is produced from a clear plastic (LEXAN™ in some prototypes), and the LED 102 is substantially a clear plastic also, the use of an epoxy 196 which when it dries is also not only colorless but also transparent, then the following optical effect occurs. The LED 102, the LEXAN™ body 180 and the dried epoxy 196 all seem to merge into a continuous oneness. Only upon close examination can an observer distinguish the boundaries of the rod hole 184/194 or the LED 102. Less careful study finds that the LED 102's electrodes appear to have been originally set in the tip body 180, as both the epoxy 196 and the LED are very nearly invisible.

Other aspects of the completed lighted fishing rod 100 in accordance with the invention include a foam sleeve (indicated as 198 in FIG. 9) which covers,the base sleeve 136 (FIG. 9) of the handle 114. If the rod shaft 110 is produced in two pieces (not all are, some OEM's keep them in one piece) and it "breaks" apart at a ferrule connection 118 (see FIG. 8), then there is the matter of the bungee pullout eliminator 120 as shown by FIGS. 8 or 11. The pullout eliminator 120 is cut out a spent, tire inner-tube, which probably is produced from a synthetic rubber material. The pullout eliminator 120 comprises a short strap having opposite ring ends, each which has a central eye. FIG. 8 shows that the ring ends are disposed on opposite sides of the ferrule connection 118. This allows the ferrule connection 118 to be pulled apart while limiting the distance that the two rod pieces can come apart. Sufficient extra length of the conductors 172 and 176 is bunched loosely inside the rod shaft 110 to allow disconnection of the ferrule 118 without pulling out from one or another of the soldered or solder-less connections somewhere inside.

As mentioned previously, the conversion of this rod from its off-the-shelf, unlit format into the lighted rod 100 in accordance with the invention, is achieved with less than $4.00 of parts. Moreover, the amount of labor to do so comprises something less than one work-hour by an experienced practitioner. In fact, the labor expense of one work-hour could be reduced dramatically if the rod tip 112 were not produced individually by hand but cast or molded in bulk quantities instead.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A lighted fishing rod comprising:

a hollow shaft extending between an open tip end and an open base end;

a tip on the tip end supporting an end eyelet off the shaft and having a body;

a tubular reel seat assembly disposed telescoped on the shaft from the base end and slid up the shaft to leave a short extension of the base of the shaft exposed;

a tubular handle assembly extending between a forward end and a butt end and disposed telescoped on the shaft from the base end such that the forward end is slid up generally to the reel seat assembly, and having a flexible membrane sealing the butt end;

a lighting system mounted substantially waterproof inside interior spaces of the lighted fishing rod, and comprising an LED lamp, a battery and battery holder, a push-to-ON/push-to-OFF switch, and conductors arranged to complete a circuit thereamong;

wherein the body of the tip is formed with a socket for telescoping over the tip end of the shaft, the body also being formed with a compartment in communication with the socket and in which is potted the LED such that terminals of the LED extend toward the socket to allow conductors passing out the tip end of the shaft to connect to said terminals;

wherein the switch is mounted in the handle assembly in such close proximity to the flexible membrane such that a user actuates the switch by digitally flexing the membrane whereby illumination of the LED gives an observer visual feedback of the absence or presence of movement of the tip including during low light levels or darkness.

2. The fishing rod of claim 1, wherein the tip comprises a main lumen extending between spaced open ends, one end of which is fashioned as the socket thereof and the other being fashioned as the LED compartment thereof.

3. The fishing rod of claim 1, wherein the tip body is produced from a transparent or translucent material which allows for illumination by the LED.

4. The fishing rod of claim 3, wherein the LED is potted in a transparent or translucent potting compound which allows for illumination by the LED.

5. The fishing rod of claim 1, wherein the tubular handle assembly comprises two sections which connect together by a sealed connection, the disconnection of which allows access to the batteries for replacement.

6. The fishing rod of claim 5, wherein the sealed connection comprises mating male and female fittings with an interposed gasket therebetween to seal out water.

7. The fishing rod of claim 6, wherein the mating male and female fittings comprise garden hose fittings.

8. The fishing rod of claim 1, wherein the shaft is sectioned in two at about a mid-section thereof and provided with a ferrule connection;

the lighted fishing rod further comprising a resilient pullout eliminator spanning across the ferrule connection and for protecting the conductors inside that stretch across the gap of the pulled apart shaft from pulling out from one or another of the soldered or solderless connections somewhere inside.

9. The fishing rod of claim 1, wherein the battery comprises a pair of battery cells of a diminutive size as to allow sliding insertion with the tubular handle assembly.

10. A lighted fishing rod comprising:

a hollow shaft extending between an open tip end and an open base end;

a tip on the tip end supporting an end eyelet off the shaft and having a body;

a tubular reel seat assembly disposed telescoped on the shaft from the base end and slid up the shaft to leave a short extension of the base of the shaft exposed;

a tubular handle assembly extending between an open forward end and a closed butt end and disposed telescoped on the shaft from the base end such that the forward end is slid up generally to the reel seat assembly;

the tubular handle assembly having a portion formed as membrane means for flexing under digital pressure applied on the outside thereof to allow actuation of the switch on the inside thereof and thereby providing a waterproof barrier for the switch;

a lighting system mounted substantially waterproof inside interior spaces of the lighted fishing rod, and comprising an LED lamp, a battery and battery holder, a push-to-ON/push-to-OFF switch, and conductors arranged to complete a circuit thereamong;

wherein the body of the tip is formed with a socket for telescoping over the tip end of the shaft, the body also being formed with a compartment in communication with the socket and in which is potted the LED such that terminals of the LED extend toward the socket to allow conductors passing out the tip end of the shaft to connect to said terminals;

wherein the switch is mounted in the handle assembly in such close proximity to the membrane means such that a user actuates the switch by digitally flexing the membrane whereby illumination of the LED gives an observer visual feedback of the absence or presence of movement of the tip including during low light levels or darkness.

11. The fishing rod of claim 10, wherein th e tip comprises a main lumen extending between spaced open ends, one end of which is fashioned as the socket thereof and the other being fashioned as the LED compartment there of.

12. The fishing rod of claim 10, wherein the tip body is produced from a transparent or translucent material which allows for illumination by the LED.

13. The fishing rod of claim 12, wherein the LED is potted in a transparent or translucent potting compound which allow s for illumination by the LED.

14. The fishing rod of claim 10, wherein the tubular handle assembly comprises two sections which connect together by a sealed connection, the disconnection of which allows access to the batteries for replacement.

15. The fishing rod of claim 14, wherein the sealed connection comprises mating male and female fittings with an interposed gasket therebetween to seal out water.

16. The fishing rod of claim 15, wherein the mating male and female fittings comprise garden hose fittings.

17. The fishing rod of claim 10, wherein the shaft is sectioned in two at about a mid-section thereof and provided with a ferrule connection;

the lighted fishing rod further comprising a resilient pullout eliminator spanning across the ferrule connection and for protecting the conductors inside that stretch across the gap of the pulled apart shaft from pulling out from one or another of the soldered or solder-less connections somewhere inside.

* * * * *